TELEPHONE OPERATED OPTOELECTRONIC VOLUME CONTROL

Filed Feb. 23, 1966

INVENTOR.
CLIFFORD O. SHAW

United States Patent Office 3,446,976
Patented May 27, 1969

3,446,976

TELEPHONE OPERATED OPTOELECTRONIC VOLUME CONTROL

Clifford O. Shaw, 680 S. Prospect, Orange, Calif. 92667

Filed Feb. 23, 1966, Ser. No. 529,515
Int. Cl. G02f *1/28*
U.S. Cl. 250—217 3 Claims

ABSTRACT OF THE DISCLOSURE

A remote volume control apparatus operated by the varying magnetic field produced by the ringing of a telephone to decrease the volume of an audio amplifier during a telephone conversation. The remote volume control apparatus can be manually reset to restore the volume of the audio amplifier to the original level after the telephone conversation has terminated.

This invention relates to electronic control and more particularly to a triggered impedance switching device which, when actuated by the ringing of a telephone will automatically lower the output of an amplifier.

Although the device is adaptable for use in various specific applications, it will be described herein with reference to triggered volume control in an audio power amplifier.

An object of this invention is the provision of a simple and reliable triggered volume control device, which when actuated by the ringing of a telephone, will automatically attenuate, by electronic means, the output of an audio power amplifier, and, once actuated, said device will remain in its triggered state, keeping the output of said amplifier attenuated, until said device is manually reset, therefore providing the means for more intelligent telephone conversation.

Another object of this invention is to provide a triggered volume control device, which when in its quiescent state, if properly installed on an audio power amplifier, will not change the normal operating characteristics of said amplifier.

Still another object of this invention is to provide a triggered volume control device which can be actuated by the amplified output signal of a telephone magnetic pickup which is placed in the magnetic field produced by the ringing of a telephone, therefore, requiring no electrical connection to said telephone.

Still a further object of this invention is to provide a triggered volume control device which is economical to manufacture, consumes minimum power, and will require very little maintenance after installation on any audio power amplifier.

These and other objects and advantages of this invention will become apparent from the following detailed description when taken with the accompanying drawings illustrating several embodiments of the invention. It will be understood, however, that the drawings are of purposes of illustration and are not to be construed as defining the scope or limits of the invention, reference being had for the latter purpose to the claims appended hereto.

In the drawings wherein like reference characters denote like parts in the several views.

Figure 1:
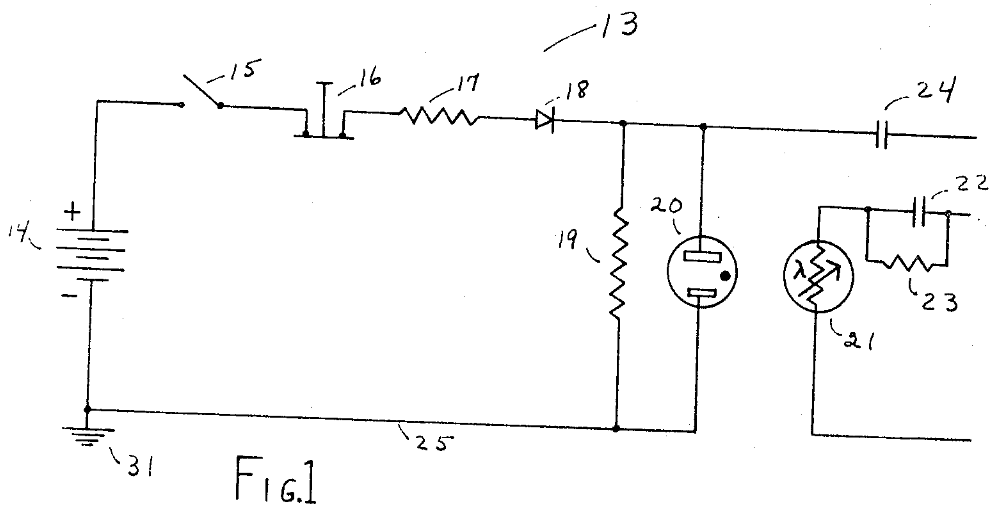
FIGURE 1 is a schematic diagram of the voltage actuated impedance switch.
Figure 2:
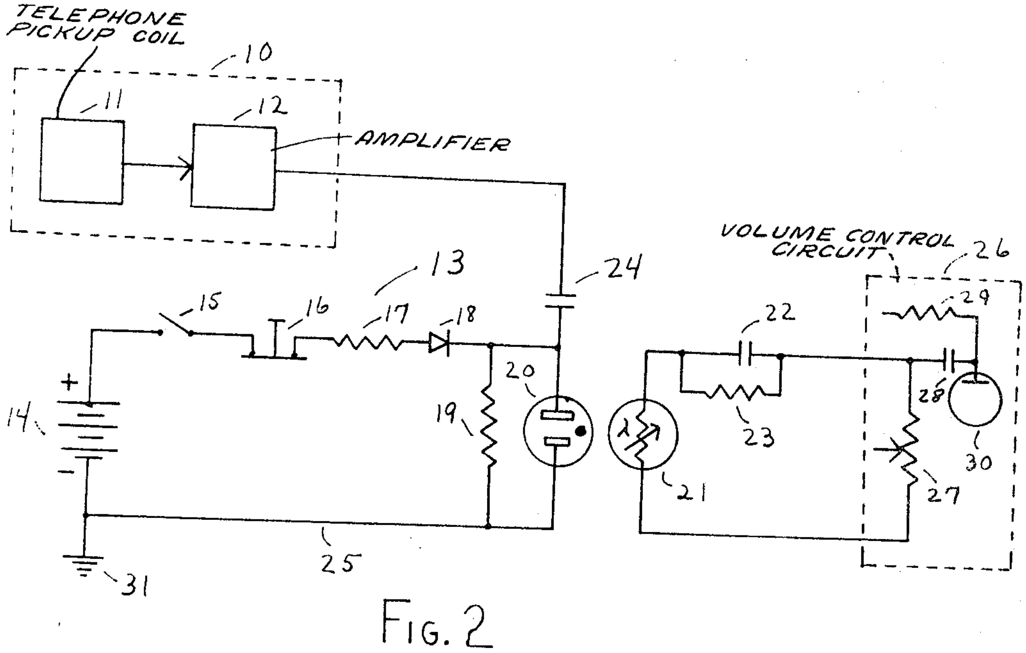
FIGURE 2 is a schematic diagram of the voltage actuated impedance switch showing connections to an audio power amplifier in combination with a block diagram showing how said device is actuated by means of a telephone magnetic pickup.

Referring now specifically to the drawing, a voltage actuated impedance switch 13 shown in FIGURE 1, comprising, in combination, a bias battery 14, an on-off switch 15, a reset switch 16, resistors 17, 19, and 23, a diode 18, a glow discharge tube 20, a photoconductive cell 21, capacitors 22 and 24, and an electrical conductor 25, made in accordance with the present invention is shown in FIGURE 2 to include a triggering means 10 comprising a telephone magnetic pickup 11 and amplifier 12, said telephone magnetic pickup 11 being mounted on a telephone, in the magnetic field of said telephone ringing coil. The telephone magnetic pickup 11, produces an output voltage when it is energized by the telephone ringing coil, however, no detail description of said pickup will be given as it is commercially available in several embodiments. Amplifier 12 is a convential audio frequency amplifier capable of amplifying the low audio frequency output of the telephone magnetic pickup 11 with sufficient gain to allow the output voltage of said amplifier 12, when coupled through capacitor 24 to a parallel circuit consisting of resistor 19 and glow discharge tube 20, to trigger said glow discharge tube 20 which is biased by bias battery 14 at a voltage less than the required trigger voltage but greater than the required holding voltage for said glow discharge tube 20.

The positive terminal of bias battery 14 is connected through an on-off switch 15, a reset switch 16, resistor 17, and diode 18 to the parallel circuit comprising resistor 19 and glow discharge tube 20. The other side of resistor 19 and glow discharge tube 20 is connected through electrical conductor 25 to the negative terminal of bias battery 14 which is grounded at 31.

The glow discharge tube 20 is mounted on the face of photoconductive cell 21, said glow discharge tube 20 and said photoconductive cell 21 being mounted in a light tight enclosure which provides total darkness on the face of photoconductive cell 21 when glow discharge tube 20 is not energized. The light tight enclosure housing glow discharge tube 20 and photoconductive cell 21, is mounted near the manual volume control on an audio power amplifier as shown in FIGURE 2 in a typical audio power amplifier manual volume control circuit 26, comprising potentiometer 27, coupling capacitor 28, plate load resistor 29, and vacuum tube 30. One side of the photoconductive cell 21 is connected through a parallel circuit, comprising capacitor 22 and resistor 23, to the top side of potentiometer 27. The other side of photoconductive cell 21 is connected to the ground side of the potentiometer 27.

The operation of this device will now be readily understood. When the on-off switch 15 is placed in the on position, an electrical current path is completed from the positive terminal of bias battery 14, through the series circuit consisting of on-off switch 15, the normally closed contacts of reset switch 16, resistor 17, diode 18, and the parallel combination consisting of resistor 19 and glow discharge tube 20, the other side of said parallel combination being connected through electrical conductor 25 to the negative terminal of bias battery 14, said negative terminal being connected to electrical ground at 31. A voltage is produced across resistor 19, the polarity of this voltage being positive on the diode 18 side of said resistor 19 and negative on the ground 31 side of said resistor 19. The voltage produced across resistor 19 is determined by the bias battery 14 voltage and the ratio of the ohmic values of resistors 17 and 19, respectively, assuming the voltage drop across other parts of the series circuit to be negligible. Since the ohmic value of resistor 17 is many times smaller than the ohmic value of resistor 19, most of the voltage delivered by bias battery 14 will appear across resistor 19. The glow discharge tube 20 is connected in parallel with resistor 19, therefore the same voltage appearing across resistor 19 will appear across glow discharge tube 20. The bias battery 14 is chosen so as to produce a voltage across the parallel combination of resistor 19 and glow discharge tube 20, said votlage being less than the voltage required to trigger glow discharge tube 20, but greater than the required holding voltage for glow discharge tube 20 once said glow discharge tube 20 has been triggered.

When a telephone rings, the varying magnetic field surounding the telephone ringing coil induces a voltage in the telephone magnetic pickup 11, said voltage being coupled into amplifier 12. The gain of amplifier 12 is sufficient to produce an output voltage, which when coupled through capacitor 24 to the parallel combination consisting of resistor 19 and glow discharge tube 20, is great enough to increase the voltage produced across said glow discharge tube 20 by bias battery 14, to the required trigger voltage of glow discharge tube 20.

Glow discharge tube 20 will trigger and remain conducting due to the sufficient holding voltage produced by bias battery 14, thus illuminating the face of photoconductive cell 21. The normally high dark resistance of the photoconductive cell 21 will decrease to a low value, which, in combination with the parallel network consisting of capacitor 22 and resistor 23, will effectively lower the impedance of a manual volume control circuit 26, therefore reducing the output of the audio power amplifier. Capacitor 22 offers low impedance to the audio frequencies being attenuated and resistor 23 provides a discharge path for capacitor 22 when the photoconductive cell 21 is not illuminated.

When the telephone conversation has terminated, the invention can be reset by momentarily operating reset switch 16, which will momentarily remove the holding voltage across the parallel combination of resistor 19 and glow discharge tube 20, therefore extinguishing glow discharge tube 20 and allowing the resistance of the photoconductive cell 21 to return to its normal dark resistance value. This will return the output of the audio power amplifier to its previously manually set level.

While this invention has been described with particular reference to the construction shown in the drawing and while various changes may be made in the detail construction, it shall be understood that such changes shall be within the spirit and scope of the present invention as defined by the appended claims.

Having thus completely and fully described the invention, what is now claimed as new and desired to be protected by Letters Patent of the United States is:

1. A telephone operated optoelectronic volume control for decreasing the volume of an audio amplifier during a telephone conversation comprising:

(a) the ringing coil of a telephone as a signal source means, (b) a telephone magnetic pickup means placed in the magnetic field of said ringing coil for receiving a signal voltage from said signal source means, said telephone magnetic pickup being electrically connected to the input of an amplifying means, (c) a bias voltage supply means, (d) a glow dischareg tube means connected in parallel with said bias voltage supply means, (e) said amplifying means output signal voltage electrically connected in parallel with said glow discharge tube means by a signal coupling means, (f) a photo-conductive means operable to be actuated by electromagnetic radiation from said glow discharge tube means, (g) said photo-conductive means being connected to an audio amplifier volume control means to provide a low impedance signal path in parallel with said volume control means when said photo-conductive means is actuated, (h) a signal voltage from said signal source means causing said glow discharge tube means to trigger, thus actauting said photo-conductive means thereby decreasing said volume.

(i) a reset means for manually resetting the volume of the audio amplifier to its original level once the telephone conversation has terminated.

(j) a means for making said telephone operated optoelectronic volume control inoperable when not in use.

2. A telephone operated optoelectronic volume control as recited in claim 1 wherein said bias voltage supply means is comprised of a battery and a voltage divider means, said voltage divider output voltage is less than the voltage required to trigger said glow discharge tube means and greater than the required holding voltage for said glow discharge tube means once said glow discharge tube means has been triggered.

3. A telephone operated optoelectronic volume control as recited in claim 1, wherein said glow discharge tube means, once triggered, will remain conducting until manually reset by momentarily disconnecting said bias voltage supply means from said glow discharge tube means, whereby once said telephone operated optoelectronic volume control has been manually reset, the volume of the audio amplifier wil be restored to its original level until again operated by the ringing of the telephone.

References Cited

UNITED STATES PATENTS

| | | | |
|---|---|---|---|
| 2,838,719 | 6/1958 | Chitty | 250—217 X |
| 3,040,178 | 6/1962 | Lyman et al. | 250—213 |
| 3,072,795 | 1/1963 | Badmaieff | 330—59 X |
| 3,082,381 | 3/1963 | Morrill et al. | 330—59 |
| 3,175,047 | 3/1965 | Borberg | 179—82 |
| 3,175,090 | 3/1965 | Reis et al. | 250—213 X |
| 3,254,159 | 5/1966 | Condict | 197—1 |
| 3,294,901 | 12/1966 | Stanghi | 250—239 X |
| 3,374,317 | 4/1968 | Chapin | 179—84 |

RALPH G. NILSON, *Primary Examiner.*

T. N. GRIGSBY, *Assistant Examiner.*

U.S. Cl. X.R.

179—1, 84; 250—213